(12) United States Patent
Elson et al.

(10) Patent No.: US 6,231,103 B1
(45) Date of Patent: May 15, 2001

(54) SEAT FOR MOTOR VEHICLE

(75) Inventors: Gerald Lee Elson, Rochester; Elisabeth B. Nevitt, Shelby Township; Gregory J. Cenzer, Warren; James A. Watson, Madison Heights; Michael A. Jones, Oak Park; Robert W. Smith; Nancy M. Simioni, both of Troy; Michael H. Bates, Oxford; Francis Nile Smith, Clarkston; Juan M. Capo, Rochester Hills, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/270,470

(22) Filed: Mar. 15, 1999

(51) Int. Cl.[7] ...................................................... B60N 2/14
(52) U.S. Cl. .................................. 296/65.06; 296/65.05; 296/65.03; 296/65.09
(58) Field of Search .............................. 296/65.03, 65.05, 296/65.06, 65.09; 297/14, 13

(56) References Cited

U.S. PATENT DOCUMENTS

| | | | |
|---|---|---|---|
| 2,565,408 | * 8/1951 | Teders, Jr. . | |
| 4,700,989 | * 10/1987 | Ercilla | 297/331 |
| 4,740,030 | * 4/1988 | Nordskog | 297/13 |
| 4,993,666 | * 2/1991 | Baymak et al. | 244/122 |
| 5,299,852 | * 4/1994 | Beasley | 297/335 |
| 5,328,231 | * 7/1994 | Raymond | 297/13 |
| 5,498,051 | * 3/1996 | Sponsler et al. | 296/65.1 |
| 5,593,208 | * 1/1997 | Mitschelen et al. | 297/336 |
| 5,634,686 | * 6/1997 | Okazaki | 297/336 |
| 5,662,368 | * 9/1997 | Ito et al. | 296/65.1 |
| 5,671,965 | * 9/1997 | O'Connor | 296/65.1 |
| 5,707,103 | * 1/1998 | Balk | 297/13 |
| 5,746,465 | * 5/1998 | Jones et al. | 296/65.1 |
| 6,000,742 | * 12/1999 | Schaefer et al. | 296/65.09 |

FOREIGN PATENT DOCUMENTS

639855  *  8/1927  (FR) ........................................ 297/13

* cited by examiner

Primary Examiner—Dennis H. Pedder
Assistant Examiner—Mickki D. Murray
(74) Attorney, Agent, or Firm—Charles E. Leahy

(57) ABSTRACT

A foldable motor vehicle seat including a horizontal seat cushion and a vertical seat back joined at a horizontal hinge for pivotal movement of the seat cushion from a horizontal position to a vertical position folded against the seat back. The seat back is connected to a side wall of a body of the motor vehicle for pivotal movement about a vertical axis between a seating position in a plane perpendicular to a longitudinal centerline of the motor vehicle and a cargo position in a plane parallel to the longitudinal centerline. With the seat cushion folded vertically against the seat back and the seat back in its cargo position, the floor of the motor vehicle under the seat is exposed for cargo. With the seat cushion horizontal and the seat back in its seating position, a passenger may sit on the foldable seat. A strut pivotally supported on the seat cushion has a raised position against a side of the seat cushion and a lowered position when the seat cushion is horizontal defining a vertical brace between the seat cushion and the floor. A latch releasably secures the strut to the floor of the motor vehicle.

4 Claims, 4 Drawing Sheets

SEAT FOR MOTOR VEHICLE

TECHNICAL FIELD

This invention relates to a motor vehicle seat.

BACKGROUND OF THE INVENTION

A motor vehicle seat typically includes a horizontal seat cushion and a vertical seat back joined at a horizontal hinge for pivotal movement of the seat back through a relatively small angle for occupant comfort and/or to make the space behind the seat more accessible. In some motor vehicle seats, referred to herein as "foldable seats", the seat back is pivotable through a substantially greater angle relative to the seat cushion to a position folded flat against the seat cushion and defining a horizontal platform for cargo. In a similar foldable seat, the seat cushion is itself connected to a floor of the motor vehicle at a second horizontal hinge which permits the folded seat to be pivoted to a vertical position in which the floor under the seat is exposed and available for cargo. In a functionally similar foldable seat, the seat back and the seat cushion are each hinged to the vehicle body for independent pivotal movement about respective ones of a pair of horizontal axes. The seat cushion pivots up from its usual horizontal position to a vertical position exposing a well under the seat and the seat back pivots down behind the seat cushion from its usual vertical position to a horizontal position covering the well and expanding the area of the floor of the vehicle available for cargo. A foldable motor vehicle seat according to this invention is a novel alternative to the above described foldable motor vehicle seats.

SUMMARY OF THE INVENTION

This invention is a new and improved foldable motor vehicle seat including a horizontal seat cushion and a vertical seat back joined at a horizontal hinge for pivotal movement of the seat cushion from a horizontal position to a vertical position folded against the seat back. The seat back is connected to a side wall of a body of the motor vehicle for pivotal movement about a vertical axis between a seating position in a plane perpendicular to a longitudinal centerline of the motor vehicle and a cargo position in a plane generally parallel to the longitudinal centerline of the motor vehicle. With the seat cushion folded vertically against the seat back and the seat back in its cargo position, a floor of the motor vehicle under the seat is exposed for cargo. With the seat cushion horizontal and the seat back in its seating position, a passenger may sit on the foldable seat. A strut on the seat cushion has a raised position against a side of the seat cushion when the latter is folded vertically against the seat back and a lowered position when the seat cushion is horizontal defining a vertical brace between the seat cushion and the floor. A latch on the seat cushion releasably secures the strut to the floor of the motor vehicle.

DESCRIPTION OF THE PREFERRED EMBODIMENT

Figure 1:
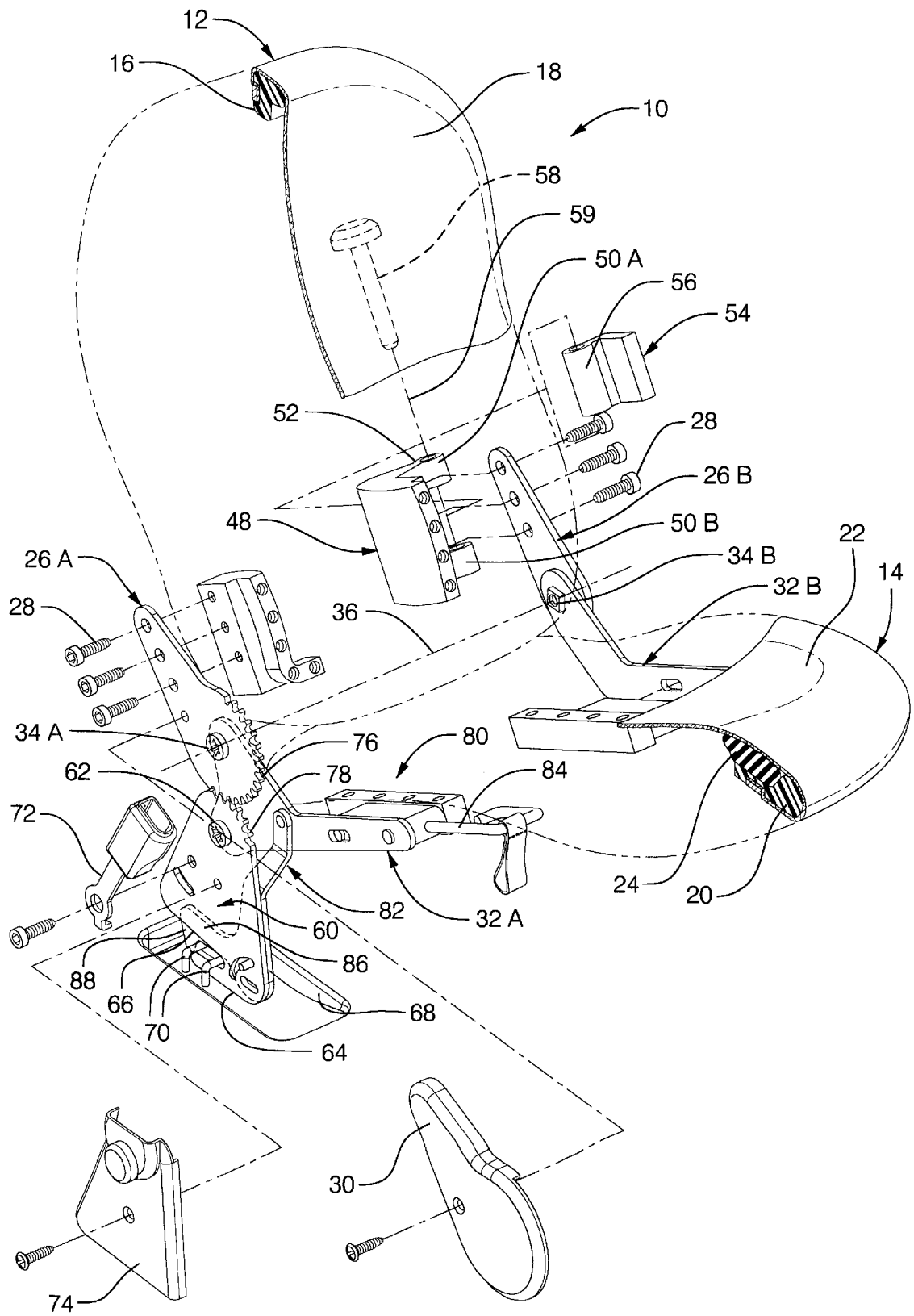
FIG. 1 is a partially broken-away, exploded perspective view of a foldable motor vehicle seat according to this invention.

Referring to FIG. 1, a foldable motor vehicle seat 10 according to this invention includes a seat back 12 and a seat cushion 14. The seat back 12 includes a fragmentarily illustrated structural frame 16 and a flexible cover 18 over the frame. The seat cushion 14 includes a structural frame 20 and a flexible cover 22 over the frame. A fragmentarily illustrated foam cushion 24 is supported on the structural frame 20 under the flexible cover 22.

A pair of straight, flat hinge plates 26A,26B are rigidly secured to the structural frame 16 of the seat back 12 by a plurality of fasteners 28 and concealed behind a corresponding pair of plastic covers, only a single plastic cover 30 being illustrated in the drawings. A pair of flat hinge plates 32A,32B are rigidly secured to the structural frame 20 of the seat cushion 14 by a similar plurality of fasteners, not shown. A pair of studs 34A,34B between the hinge plates 26A,32A and 26B,32B cooperate in defining a horizontal hinge by which the seat cushion 14 is joined to the seat back 12 for pivotal movement about a horizontal axis 36 between a horizontal position, FIGS. 1–2, generally perpendicular to the seat back and a vertical position, FIGS. 3–4, folded against the seat back.

A body 38 of the motor vehicle includes a fragmentarily illustrated vertical side wall 40 parallel to a longitudinal centerline, not shown, of the body and a horizontal floor 42. The side wall 40 and the floor 42 are interrupted by a wheel housing 44 having a vertical side 46 parallel to the side wall and perpendicular to the floor. An L-shaped boss 48 on the structural frame 16 of the seat back 12 has a pair of vertically separated lugs 50A,50B and a vertical bore 52 through the lugs. A hinge plate 54 rigidly attached to the vertical side 46 of the wheel housing has a tubular boss 56 between the lugs 50A,50B. Forward or aft of the wheel housing 44, the hinge plate 54 may be attached directly to the vertical side wall 40 of the vehicle body. A pin 58 extends through the vertical bore 52 and the tubular boss 56 and cooperates with each in defining a vertical hinge at which the seat back 12 is pivotable relative to the vehicle body about a vertical axis 59 between a seating position, FIGS. 1–3, generally perpendicular to the vertical side wall 40 and to the longitudinal centerline of the motor vehicle and a cargo position, FIG. 4, generally parallel to the vertical side wall 40 and to the longitudinal centerline of the motor vehicle.

Figure 2:
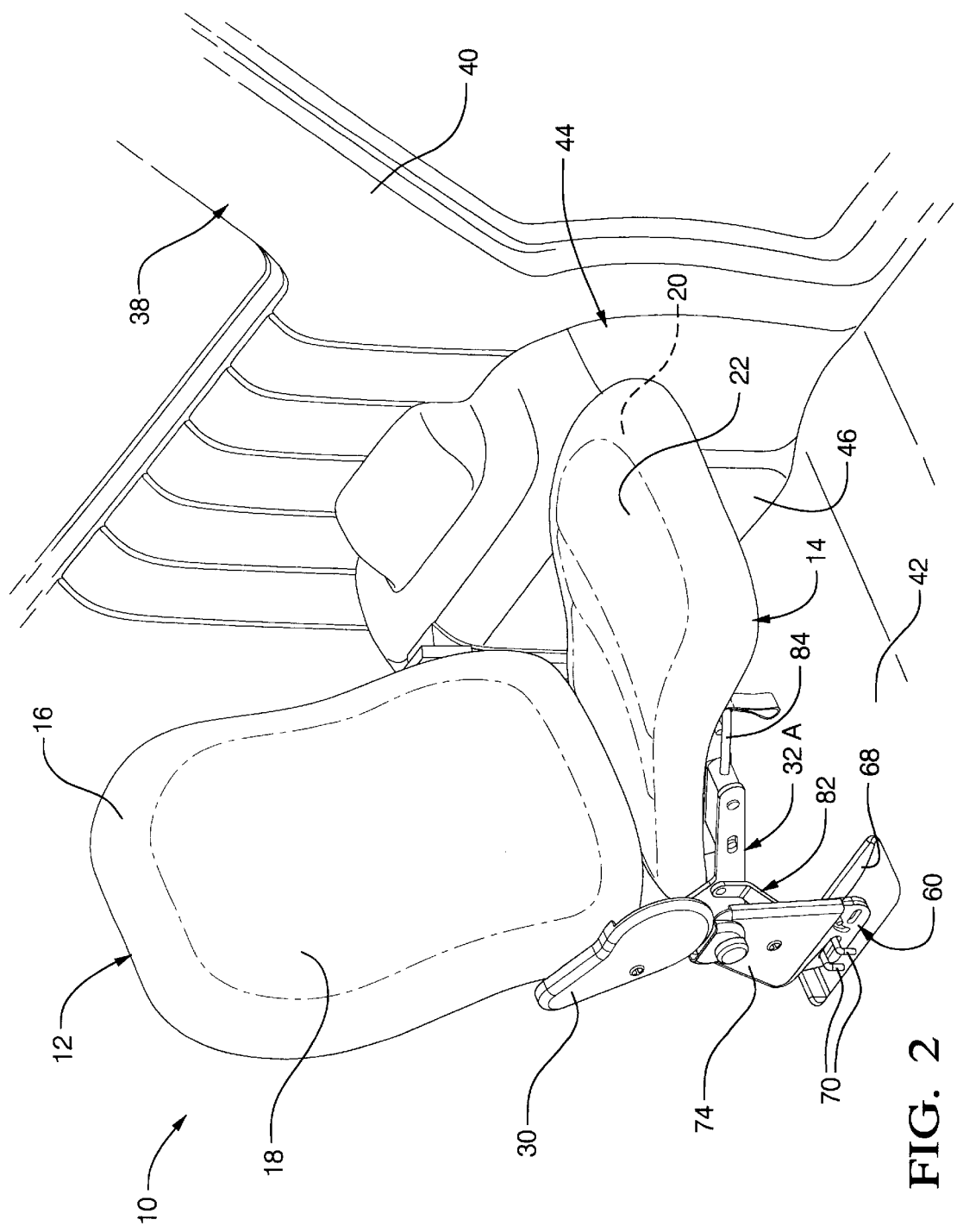
FIG. 2 is a perspective view of the foldable motor vehicle seat according to this invention.
Figure 3:
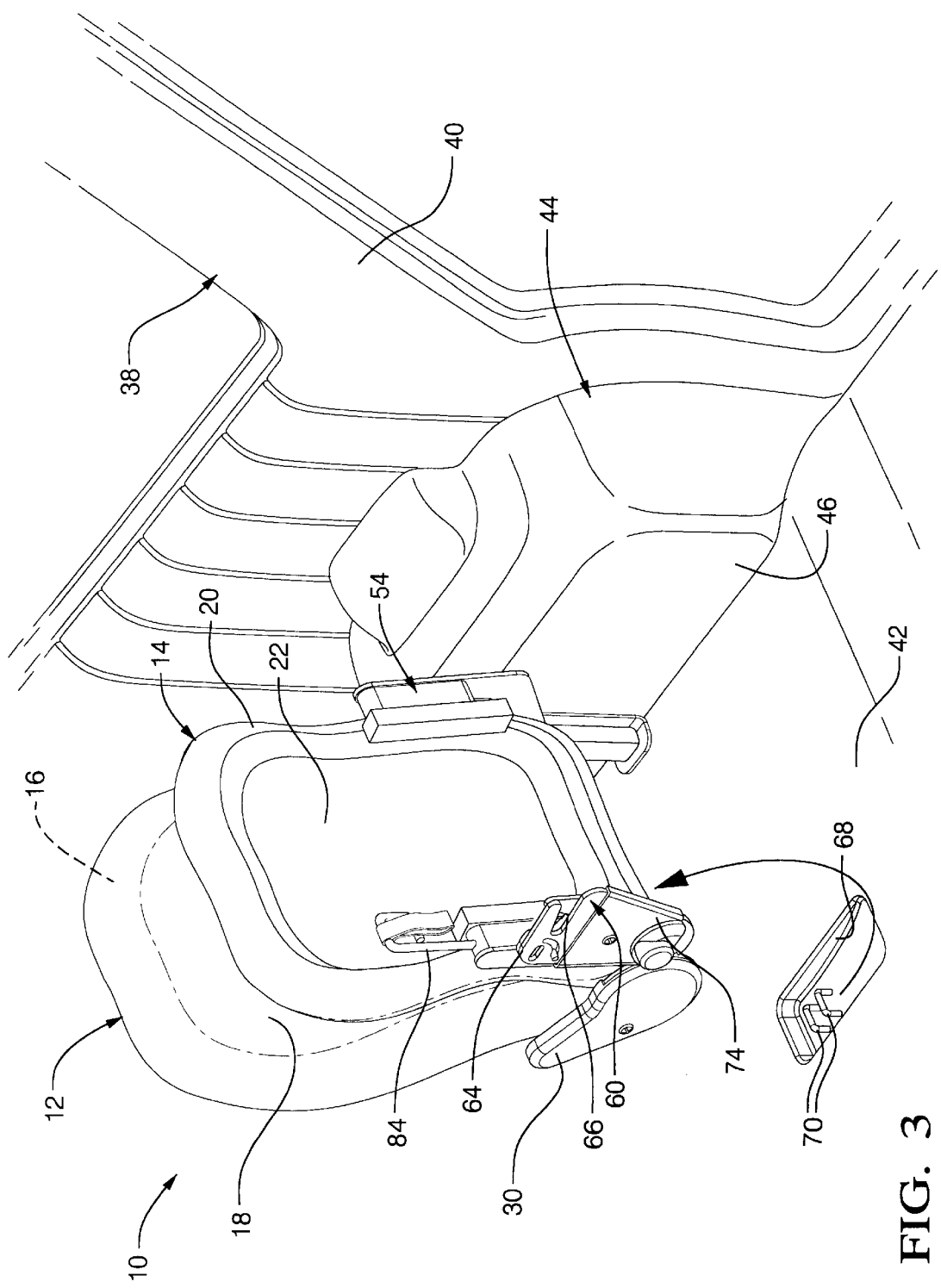
FIG. 3 is similar to FIG. 2 but illustrates structural elements of the foldable motor vehicle seat according to this invention in different relative positions.
Figure 4:
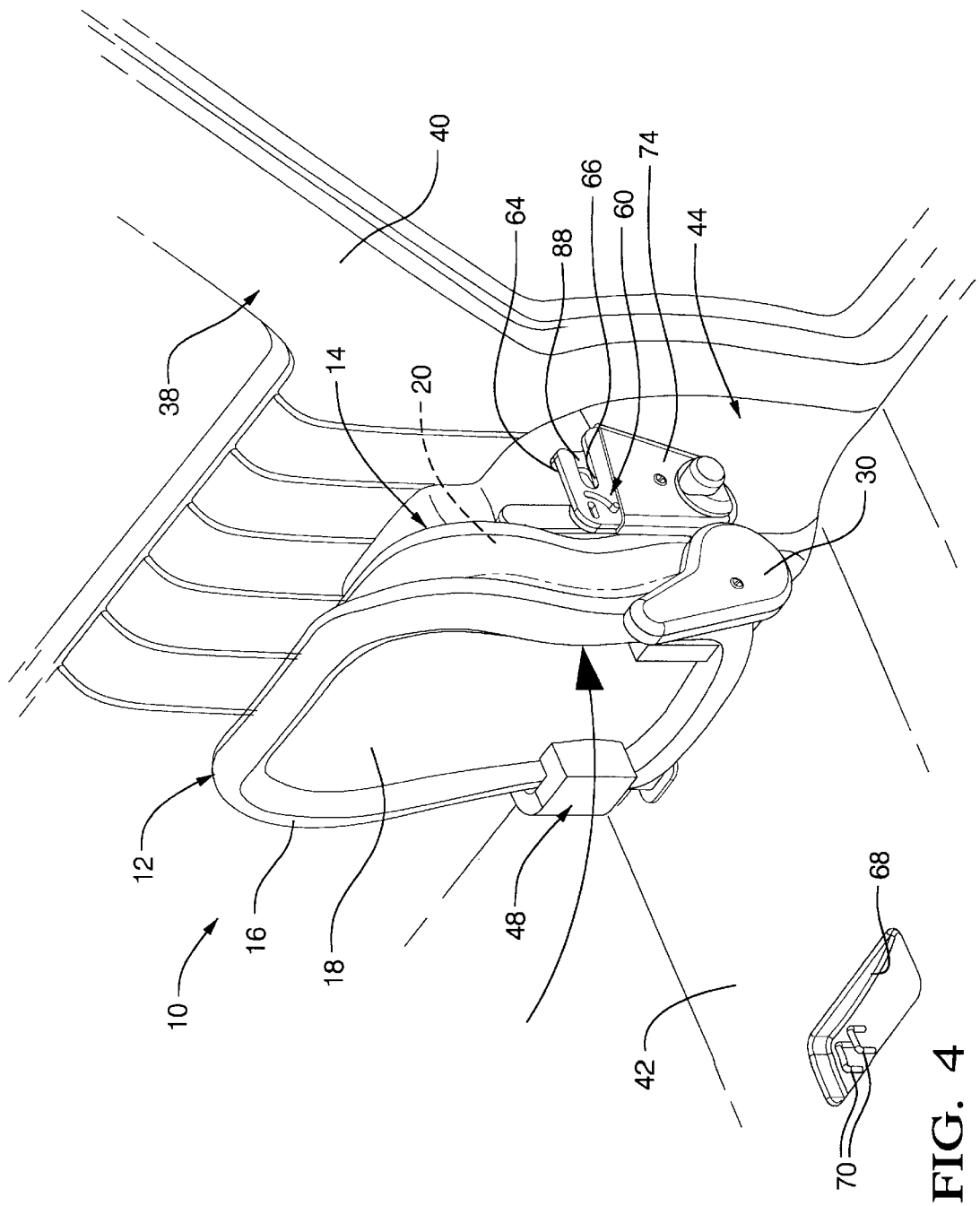
FIG. 4 is similar to FIG. 3 but illustrates structural elements of the foldable motor vehicle seat according to this invention in different relative positions.

A flat strut 60 is supported on the hinge plate 32A on the seat cushion 14 by a stud 62 on the strut for pivotal movement about an axis 61 parallel to and laterally separated from the horizontal axis 36 between a lowered position, FIGS. 1–2, and a raised position, FIGS. 3–4. The flat strut has a distal end 64 and an open throat slot 66 near the distal end. In the horizontal position of the seat cushion and the lowered position of the strut, the distal end 64 of the strut seats on the floor 42 in a trough 68 in the floor and defines a vertical brace between the floor and the seat cushion. At the same time, the throat slot 66 envelopes a pair of inverted U-shaped strikers 70 rigidly attached to the floor in the trough. An end fitting 72 for a conventional occupant restraint belt, not shown, is rigidly attached to the strut 60 and concealed behind a plastic cover 74.

As seen best in FIG. 1, the hinge plate 26A on the seat back has a gear sector 76 thereon in an arc around the horizontal axis 36. The flat strut 60 has a gear sector 78 thereon in an arc around the stud 62 and the axis 61 which meshes with the gear sector 76. The gear sectors 76,78 cooperate in defining a control means for the strut 60 which pivots the strut through an angle of about 180° between its lowered and raised positions concurrent with pivotal movement of the seat cushion 14 about the horizontal axis 36 through an angle of about 90° between its horizontal and vertical positions.

A latch 80 on the foldable seat 10 includes an L-shaped latch bolt 82 and a control rod 84. The latch bolt 82 is juxtaposed the strut 60 and supported thereon for pivotal movement relative to the strut between a latched position, FIG. 1, and an unlatched position, not shown pivoted clockwise, FIG. 1, from the latched position. In the latched position of the latch bolt 82, a hook 86 thereon closes the open end of the throat slot 66 in the strut with an exposed cam edge 88 of the latch bolt traversing the throat slot. In the unlatched position of the latch bolt, the hook 86 is removed from the open end of the throat slot.

The control rod 84 is supported on the seat cushion 14 for back and forth linear translation and is linked to the latch bolt 82 by a pivot pin 89 such that when the control rod is manually pulled out against a restoring force of a spring, not shown, the latch bolt is pivoted clockwise, FIG. 1, from its latched position to its unlatched position. When the control rod is released, the spring pushes the control rod in and pivots the latch bolt counterclockwise, FIG. 1, from its unlatched position to its latched position.

When the seat back 12 is in its seating position and the seat cushion 14 is in its horizontal position, FIGS. 1–2, the foldable seat 10 is unfolded and exposed for occupancy by a passenger of the motor vehicle with a concealed portion of the floor 42 under the seat being obstructed and substantially unavailable for cargo. Concurrently, the strut 60 is in its lowered position defining the aforesaid vertical brace between the seat cushion and the floor. When the foldable seat 10 is occupied, forces attributable to the weight of the occupant are reacted to the vertical side 46 of the wheel housing 44 through the vertical hinge and to the floor 42 through the vertical brace defined by the strut. The hook 86, in the latched position of the latch bolt, prevents pivotal movement of the strut and dislodgment of the strikers 70 from the throat slot 66.

To expose the concealed portion of the floor 42 under the foldable seat 10 for cargo, an operator grasps and pulls the control rod 84 to pivot the latch bolt clockwise, FIG. 1, from its latched position to its unlatched position. The seat cushion 14 is then manually pivoted from its horizontal position, FIGS. 1–2, to its vertical position, FIG. 3, folded against the seat back 12. At the same time, the control means defined by the sector gears 76,78 pivots the strut 60 relative to the seat cushion about the axis 61 from its lowered position, FIGS. 1–2, to its raised position, FIGS. 3–4, remote from the floor and tucked against a side of the seat cushion.

With the seat cushion 14 in its vertical position and the strut 60 in its raised position, the seat back 12 is pivoted counterclockwise, FIGS. 1–3, about the vertical axis 59 from its seating position, FIGS. 1–3, to its cargo position, FIG. 4, in which the seat back is parallel of the side wall 40 of the vehicle body and the longitudinal centerline of the motor vehicle. With the seat cushion folded vertically between the seat back and the vertical side 46 of the wheel housing 44, a substantial fraction of the concealed portion of the floor 42 previously obstructed by the foldable seat 10 is exposed for cargo. The seat back may, of course, be constructed to pivot in either direction about the vertical axis 59.

For passenger seating, the above sequence is reversed. That is, the seat back 12 is pivoted about the vertical axis 59 from its cargo position to its seating position and the seat cushion is pivoted about the horizontal axis 36 from its vertical position to its horizontal position. Concurrently, the control means defined by the gear sectors 76,78 pivots the strut 60 from its raised position to its lowered position defining the brace between the seat cushion and the floor. As the strut approaches its lowered position, the strikers 70 on the floor engage the latch bolt 82 on the cam edge 88 thereof and cam or pivot the latch bolt clockwise to permit the strikers to enter the throat slot 66 of the strut under the hook 86. When the strikers clear the hook, the aforesaid spring, not shown, urging inward linear translation of the control rod 84 pivots the latch bolt counterclockwise to its latched position.

Having thus described the invention, what is claimed is:

1. A foldable motor vehicle seat comprising:
   a seat back,
   a seat cushion,
   a first hinge means operative to connect the seat cushion to the seat back for pivotal movement about a horizontal axis between a horizontal position generally perpendicular to the seat back and a vertical position folded against the seat back,
   a second hinge means operative to connect the seat back to a vertical side of a body of the motor vehicle for pivotal movement about a vertical axis between a seating position in a plane generally perpendicular to a longitudinal centerline of the motor vehicle and a cargo position in a plane generally parallel to the longitudinal centerline of the motor vehicle,
   a strut supported on the seat cushion for pivotal movement relative to the seat cushion between a lowered position defining a vertical brace between a floor of the motor vehicle and the seat cushion when the seat cushion is in the horizontal position thereof and the seat back is in the seating position thereof and a raised position juxtaposed a side of the seat cushion remote from the floor of the motor vehicle, and
   a control means operative to pivot the strut from its lowered position to its raised position in response to pivotal movement of the seat cushion relative to the seat back from its horizontal position to its vertical position and to pivot the strut from its raised position to its lowered position in response to pivotal movement of the seat cushion relative to the seat back from its vertical position to its horizontal position.

2. The foldable motor vehicle seat recited in claim 1 wherein the control means comprises:

a first gear sector on the seat back in an arc about the horizontal axis, and a second gear sector on the strut in an arc around the axis parallel to and laterally separated from the horizontal axis meshing with the first gear sector.

3. The foldable motor vehicle seat recited in claim 2 further comprising:

a latch bolts operative to releasably secure the strut in the lowered position thereof to the floor of the motor vehicle.

4. The foldable motor vehicle seat recited in claim 3 wherein the latch bolts comprises:

a striker, an open throat slot in the strut enveloping the striker in the lowered position of the strut, and said latch bolt being supported on the strut for pivotal movement between a latched position preventing dislodgment of the striker from the open throat slot and an unlatched position remote from the throat slot for unobstructed dislodgment of the striker from the open throat slot concurrent with pivotal movement of the strut from the lowered position thereof to the raised position thereof.

* * * * *